(12) United States Patent
Littow

(10) Patent No.: US 11,421,416 B2
(45) Date of Patent: Aug. 23, 2022

(54) PREFABRICATED MODULE FOR A BUILDING AND CONSTRUCTION METHOD

(71) Applicant: LITTOW ARCHITECTES, Paris (FR)

(72) Inventor: Pekka Littow, Paris (FR)

(73) Assignee: LITTOW ARCHITECTES, Paris (FR)

( * ) Notice: Subject to any disclaimer, the term of this patent is extended or adjusted under 35 U.S.C. 154(b) by 0 days.

(21) Appl. No.: 17/262,575

(22) PCT Filed: Jul. 24, 2019

(86) PCT No.: PCT/EP2019/069953
§ 371 (c)(1),
(2) Date: Jan. 22, 2021

(87) PCT Pub. No.: WO2020/020963
PCT Pub. Date: Jan. 30, 2020

(65) Prior Publication Data
US 2021/0372117 A1 Dec. 2, 2021

(30) Foreign Application Priority Data

Jul. 24, 2018 (FR) ...................................... 1856861

(51) Int. Cl.
*E04B 1/348* (2006.01)
*E04B 1/343* (2006.01)
(Continued)

(52) U.S. Cl.
CPC ............ *E04B 1/34869* (2013.01); *E03C 1/01* (2013.01); *E04B 1/34336* (2013.01); *E04F 17/08* (2013.01); *E03C 2201/40* (2013.01)

(58) Field of Classification Search
CPC .. E04B 1/34869; E04B 1/34336; E04F 17/08; E03C 1/01; E03C 2201/40
(Continued)

(56) References Cited

U.S. PATENT DOCUMENTS 2,665,454 A * 1/1954 Krenovborisa ........... E03C 1/01
4/670
4,574,533 A * 3/1986 Bigelow, Jr .............. E03C 1/01
52/234
(Continued)

FOREIGN PATENT DOCUMENTS

CA 2905796 A1 * 9/2014 ................ C02F 3/04
FR 2 387 818 11/1978
(Continued)

OTHER PUBLICATIONS

Bauchet Yves; FR 2721637 A1 (Dec. 29, 1995) Translation and original document translation from espace.com retrievable at https://worldwide.espacenet.com/publicationDetails/biblio?DB=EPODOC&II=0&ND=3&adjacent=true&locale=en_EP&FT=D&date=19951229&CC=FR&NR=2721637A1&KC=A1 (Year: 2021).*
(Continued)

*Primary Examiner* — Brian D Mattei
*Assistant Examiner* — Joseph J. Sadlon
(74) *Attorney, Agent, or Firm* — Nixon & Vanderhye

(57) ABSTRACT

Disclosed is a prefabricated module including, in one piece: a shower compartment, with a shower; a toilet compartment, with a toilet seat, the shower compartment and the toilet compartment being arranged longitudinally opposite one another; a kitchen compartment, which included a sink and a cooking appliance; a technical compartment, which included: a domestic water supply and a water heater, supplying domestic water to the shower and sink; an energy supply, supplying energy to the cooking appliance and the water heater; the kitchen compartment and the technical compartment being arranged between the shower compartment and the toilet compartment, which are transversely opposite one another, of the prefabricated module.

20 Claims, 8 Drawing Sheets

(51) Int. Cl.
*E03C 1/01* (2006.01)
*E04F 17/08* (2006.01)

(58) Field of Classification Search
USPC ............................................................ 52/79.1
See application file for complete search history.

(56) References Cited

U.S. PATENT DOCUMENTS

| | | | | |
|---|---|---|---|---|
| 4,653,128 | A * | 3/1987 | Canalizo | A47K 4/00 |
| | | | | 4/663 |
| 4,655,011 | A * | 4/1987 | Borges | E03C 1/01 |
| | | | | 29/464 |
| 5,285,604 | A * | 2/1994 | Carlin | B60P 3/14 |
| | | | | 52/143 |
| 5,501,046 | A * | 3/1996 | Hattingh | E04B 1/34321 |
| | | | | 52/270 |
| 7,062,802 | B2 * | 6/2006 | Habegger | A47K 4/00 |
| | | | | 4/662 |
| 7,418,803 | B2 * | 9/2008 | Jenkins | E04H 1/02 |
| | | | | 52/143 |
| 7,827,738 | B2 * | 11/2010 | Abrams | E04B 1/34331 |
| | | | | 52/79.1 |
| 7,895,794 | B2 * | 3/2011 | Pope | E04B 1/3431 |
| | | | | 52/79.5 |
| 8,141,304 | B2 * | 3/2012 | Shen | E04B 1/3444 |
| | | | | 52/645 |
| 10,287,782 | B2 * | 5/2019 | Krokfors | E04F 17/08 |
| 10,407,989 | B2 * | 9/2019 | Morrell | E21B 10/02 |
| 10,837,168 | B2 * | 11/2020 | Rittmanic | E04B 1/34861 |
| 2005/0138867 | A1 * | 6/2005 | Zhao | E04H 1/04 |
| | | | | 52/79.1 |
| 2007/0090030 | A1 * | 4/2007 | Teran | C02F 3/30 |
| | | | | 210/103 |
| 2011/0041415 | A1 | 2/2011 | Esposito | |
| 2015/0164292 | A1 | 6/2015 | Shin-Ya | |

FOREIGN PATENT DOCUMENTS

| | | | | |
|---|---|---|---|---|
| FR | 2 721 637 | | 12/1995 | |
| FR | 2721637 | A1 * | 12/1995 | ............ E04H 1/02 |
| WO | 03/033831 | | 4/2003 | |
| WO | WO-2013187351 | A1 * | 12/2013 | ........... H01L 31/042 |
| WO | WO-2014056548 | A1 * | 4/2014 | ........... E04B 1/3483 |
| WO | 2014/121359 | | 8/2014 | |

OTHER PUBLICATIONS

International Search Report for PCT/EP2019/069953 dated Oct. 18, 2019, 7 pages.
Written Opinion of the ISA for PCT/EP2019/069953 dated Oct. 18, 2019, 7 pages.

* cited by examiner

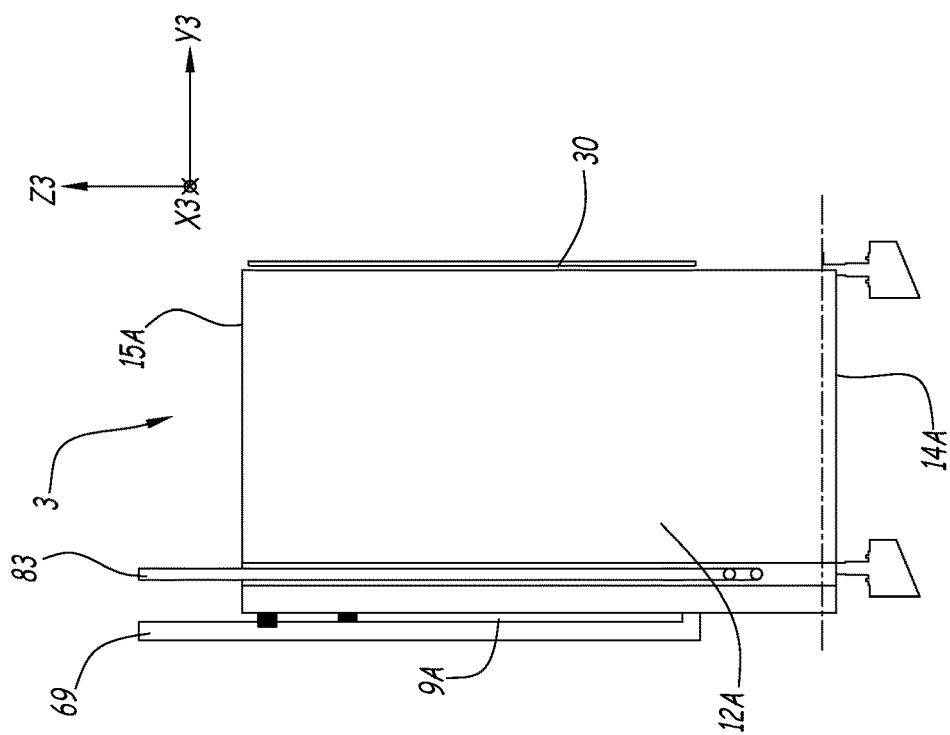
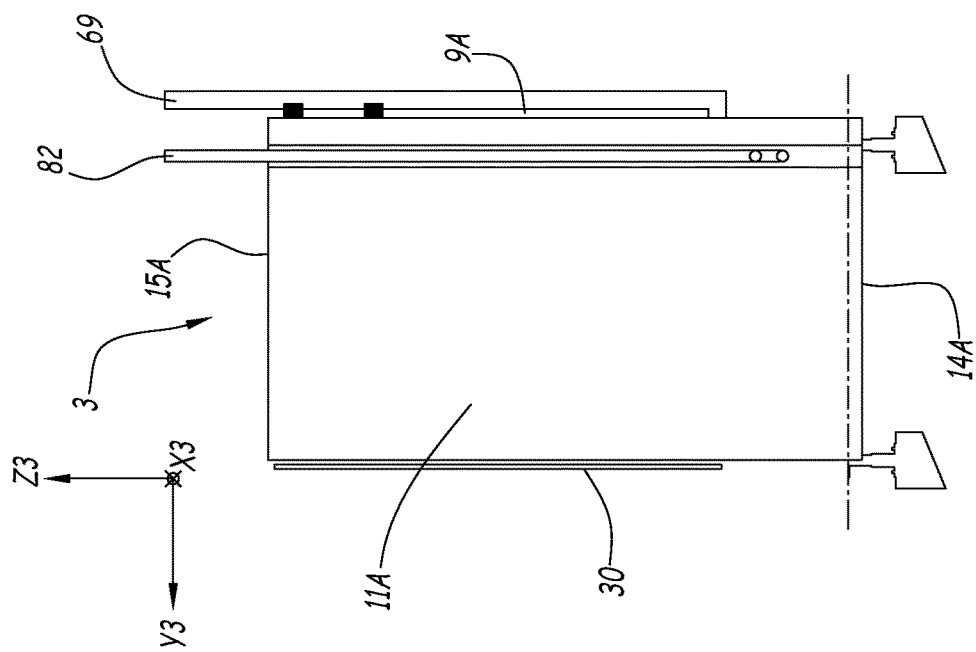

PREFABRICATED MODULE FOR A BUILDING AND CONSTRUCTION METHOD

CROSS-REFERENCE TO RELATED APPLICATIONS

This application is the U.S. national phase of International Application No. PCT/EP2019/069953 filed Jul. 24, 2019 which designated the U.S. and claims priority to FR 1856861 filed Jul. 24, 2018, the entire contents of each of which are hereby incorporated by reference.

BACKGROUND OF THE INVENTION

Field of the Invention

The present invention relates to a prefabricated module, a building, as well as a construction method for such a building.

The invention relates to the field of building construction, preferably for residential buildings, comprising at least one prefabricated module, preferably on an unserviced construction site, that is to say, not connected to the water, electricity, gas, telephone and/or sanitation grids, or in an emergency situation.

It may in particular be advantageous to construct an individual or collective building, preferably residential, on a geographically isolated site, for example a natural or desert site, or at least which is not connected to service infrastructure. In this situation, the construction of service infrastructure may represent a heavy financial investment, require administrative authorizations which are difficult to obtain, and/or have an unwanted ecological and/or esthetic impact on the environment. It may also be beneficial to construct a building after a natural disaster, or after population displacement. In this case, it may prove necessary to construct a residential building whereas the service infrastructure has been destroyed or is no longer functional, or whereas the urgency requires the residential building to be constructed quickly, irrespective of whether the construction site is equipped with service infrastructure.

Description of the Related Art

Even in these particular situations, there is a need to provide that the residential building is equipped with technical facilities providing a certain level of comfort to its inhabitants, namely in particular restrooms, a shower and a kitchen, while allowing, based on needs, customization of the living space from one building to another, the living space for example including one or several bedrooms, a living room, an office, etc.

However, the construction of such a building, which is generally done by the unit and in a customized manner, can prove particularly costly and require a substantial design time. Furthermore, the construction of the building can lead to a deterioration of the environment of the construction site, which can prove undesirable, in particular if the construction site must be preserved for ecological reasons. In a situation of geographical isolation or in a situation where the natural resources are limited, or are subject to restrictions, bringing in materials and labor for the construction can prove difficult and expensive, as can the oversight of the quality of the construction, in particular for the technical lots such as electricity, plumbing and tightness.

In particular in the case where the building must be constructed on a site where the resources are limited, or on an unserviced site, the distribution of the living space may lack optimization for the technical facilities, for example the water, electrical energy, wastewater disposal or heating facilities, which can cause a lack of efficiency or performance of these technical facilities, as well as a reduction in the living space of the building.

In order to address the drawbacks of the prior art and these technical problems, the invention proposes a new prefabricated module, facilitating and accelerating the construction of the building, while providing this building, with a high energy efficiency and easier maintenance, with a remarkable level of comfort.

The invention relates to a prefabricated module, designed to be integrated in one piece into a building, the prefabricated module comprising, in one piece:
 a shower compartment, which comprises a shower, as well as a first access opening for access by a person, placing the shower compartment directly in communication with the outside of the prefabricated module;
 a toilet compartment, which comprises a toilet seat, as well as a second access opening for access by a person, placing the toilet compartment directly in communication with the outside of the prefabricated module, the shower compartment and the toilet compartment being arranged longitudinally opposite one another, of the prefabricated module;
 a kitchen compartment, which comprises a sink, a cooking appliance, as well as a third access opening for access by a person, placing the kitchen compartment directly in communication with the outside of the prefabricated module;
 a technical compartment, which comprises:
  a domestic water supply and a water heater, supplying domestic water to the shower and the sink;
  an energy supply, supplying energy to the cooking appliance and the water heater;
  a fourth access opening for access by a person, placing the technical compartment directly in communication with the outside of the prefabricated module;
the kitchen compartment and the technical compartment being arranged between the shower compartment and the toilet compartment, the kitchen compartment and the technical compartment being transversely opposite one another, of the prefabricated module.

Owing to the invention, the prefabricated module integrates, in one piece, all or most of the technical parts of the building, in an arrangement optimized for maintenance and energy efficiency. The particular arrangement of the compartments makes the prefabricated module very compact for being transported as is and delivered on the construction site. The particular arrangement of the compartments in the prefabricated module makes it possible to concentrate most or all of the technical facilities of the building, aiming to ensure the comfort level of the occupant, in a same location of the building, once constructed. The single technical compartment of the prefabricated module simultaneously serves the shower, toilet and kitchen compartments which are adjacent to it, which optimizes space and concentrates the maintenance operations in a single place. This arrangement first optimizes the distribution of domestic water and power to the shower, toilet and or kitchen compartments, each grid advantageously passing through a single partition in order to reach the concerned compartment from the technical compartment. This arrangement optimizes any connections of the building to service infrastructure, which can be done in a single location, namely the technical compartment, even after the construction of the building, the fourth access opening advantageously being able to open to the outside of the building. The shower, kitchen and toilet compartments open onto the opposite face of the prefabricated module, so as to be accessible from the inside of the building, when the prefabricated module is integrated therein.

For preferred embodiments of the invention, where the prefabricated module is implemented to construct a partially or fully autonomous building, that is to say, partially connected, or not connected, the service infrastructure, most or all of the energy and resource production and/or storage means of the autonomous building, as well as the treatment of wastewater, are integrated into the prefabricated module, which facilitates and standardizes the construction of the autonomous building. The domestic water supply allows the building to be functional, in particular for the shower and the sink, at least during a certain usage time, without being connected to a water distribution grid. The energy supply allows the building to have hot water and a functional cooking appliance, or even advantageously to have a functional power grid, at least for certain usage time, without the building being connected to the power, gas or similar grid.

Simply integrating this prefabricated module into the building, for example a residential building, provides all of the necessary comfort to its future occupants, namely at least a shower, a restroom and a kitchen. The shower, toilet, kitchen compartments and the technical compartment being a common point of any building, in particular residential, different buildings can be designed and constructed around a respective prefabricated module, according to the prefabricated module of the invention, which allows standardization of the constructed buildings, in order to reduce their cost. In particular, it is only necessary to design the living space around the prefabricated module, without worrying, in each building, about redesigning the technical part of the building, integrated into the prefabricated module.

The prefabricated module being able to be integrated in one piece, that is to say in a preassembled manner, "as is," into the building during its construction, the quantity of work to be done on the construction site is reduced regarding the technical tasks, in particular related to the water and energy. Indeed, this work is done upon the production of the prefabricated module, which is advantageously done in advance, off the construction site. The prefabricated modules being able to be conveyed in one piece to the construction site, the need to convey unassembled materials and technicians to the construction site is reduced. The prefabricated module is therefore particularly suitable for hard-to-access construction sites. The prefabricated module being able to be made in advance and stored while awaiting the construction of the building, it can be delivered quickly to the construction site, which makes it suitable for urgent construction.

According to advantageous but optional aspects of the invention, the invention can incorporate one or more of the following features, considered according to any technically allowable combination:
for the prefabricated module:
the prefabricated module comprises façades which outwardly delimit the prefabricated module, including:
a first longitudinal façade and a second longitudinal façade which are opposite, and
a first transverse façade and a second transverse façade which are opposite, which each connect the first longitudinal façade to the second longitudinal façade;

the shower compartment is delimited by the first transverse façade and by the two longitudinal façades, the first access opening being arranged through the first longitudinal façade;
the toilet compartment is delimited by the second transverse façade and by the two longitudinal façades, the second access opening being arranged through the first longitudinal façade;
the kitchen compartment is delimited by the first longitudinal façade, the third access opening being arranged through the first longitudinal façade; and
the technical compartment is delimited by the second longitudinal façade, the fourth access opening being arranged through the second longitudinal façade.
the prefabricated module comprises a longitudinal inner partition which separates the kitchen compartment from the technical compartment, the longitudinal inner partition comprising at least one removable panel in order to access the technical compartment from the kitchen compartment.
for the prefabricated module:
the cooking appliance and the water heater are designed in order to operate using fuel, for example a fluid fuel such as gas; and
the energy supply comprises a fuel supply, supplying the cooking appliance and the water heater with fuel.
the technical compartment comprises:
a graywater supply, supplied with graywater by the shower and the sink; and
a purification apparatus, for generating domestic water by purifying graywater coming from said graywater supply, the purification apparatus supplying the domestic water supply coming from the graywater purification.
for the prefabricated module:
the prefabricated module comprises at least one outside water supply, as well as at least one outside water collector supplying the outside water supply with outside water; and
the purification apparatus generates domestic water by purifying outside water coming from the outside water supply, the purification apparatus supplying the domestic water supply with domestic water coming from the purification of the outside water.
for the prefabricated module:
the energy supply comprises:
an electricity supply,
an electrical charging connector, for connecting the electricity supply to an outside electricity source, and thus charging the electricity supply with electrical energy, and
a power connector, for connecting the electricity supply to a domestic power grid of the building, the power connector being supplied with electrical energy stored in the electricity supply; and
the technical compartment comprises an electrical generator charging the electricity supply.
the prefabricated module comprises a dry toilet, comprising the toilet seat.

The invention also relates to a building, comprising a prefabricated module according to the preceding.

Preferably, for the building, the prefabricated module is according to the preceding and:
the first longitudinal façade forms:
a first inner partition of the building, through which the first access opening is arranged, the first inner partition delimiting the shower compartment, and a second inner partition of the building, through which the second access opening is arranged, the second inner partition delimiting the toilet compartment; and the second longitudinal façade forms at least part of a lining wall of the building, through which the fourth access opening is arranged.

The invention also relates to a construction method of a building according to the preceding, the construction method comprising a step for integrating the prefabricated module into the building, whereas:

the prefabricated module is in one piece, the toilet seat is already installed in the toilet compartment, the shower is already installed in the shower compartment, the sink and the cooking appliance are already installed in the kitchen compartment, the domestic water supply and the water heater are already installed in the technical compartment and supply the shower and the sink with domestic water, and the energy supply is already installed in the technical compartment and supplies the cooking appliance and the water heater with energy.

BRIEF DESCRIPTION OF THE DRAWINGS

The invention will be better understood and other advantages thereof will appear more clearly in light of the following description of example embodiments according to the invention, in reference to the appended drawings, in which:

FIGS. 4, 5, 6 and 7 are projection views, to scale, of the prefabricated module of the preceding figures, shown in several orientations.

DESCRIPTION OF THE PREFERRED EMBODIMENTS

Figure 1:
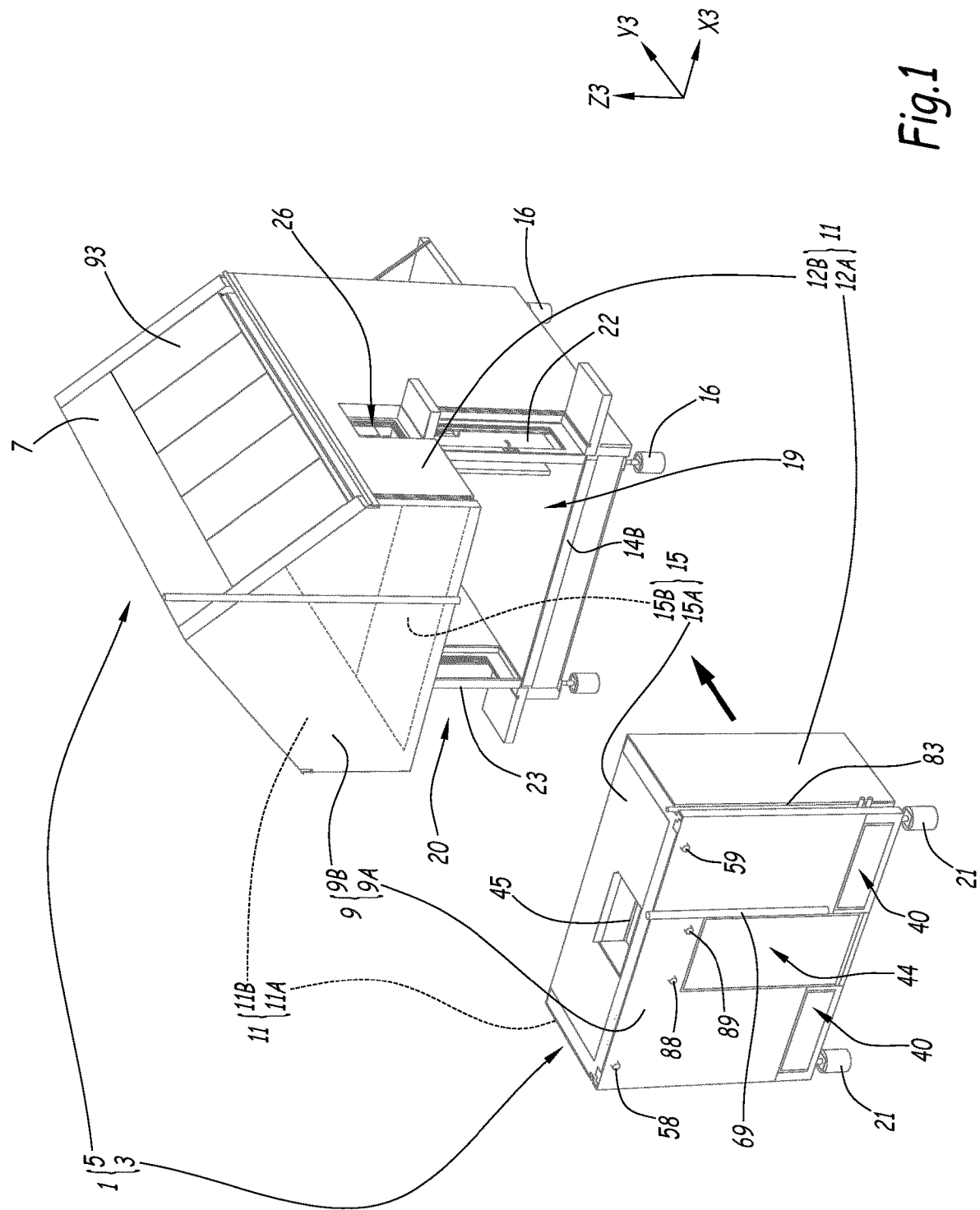
FIG. 1 is an exploded axonometric perspective view of a building comprising a prefabricated module according to the invention.
Figure 2:
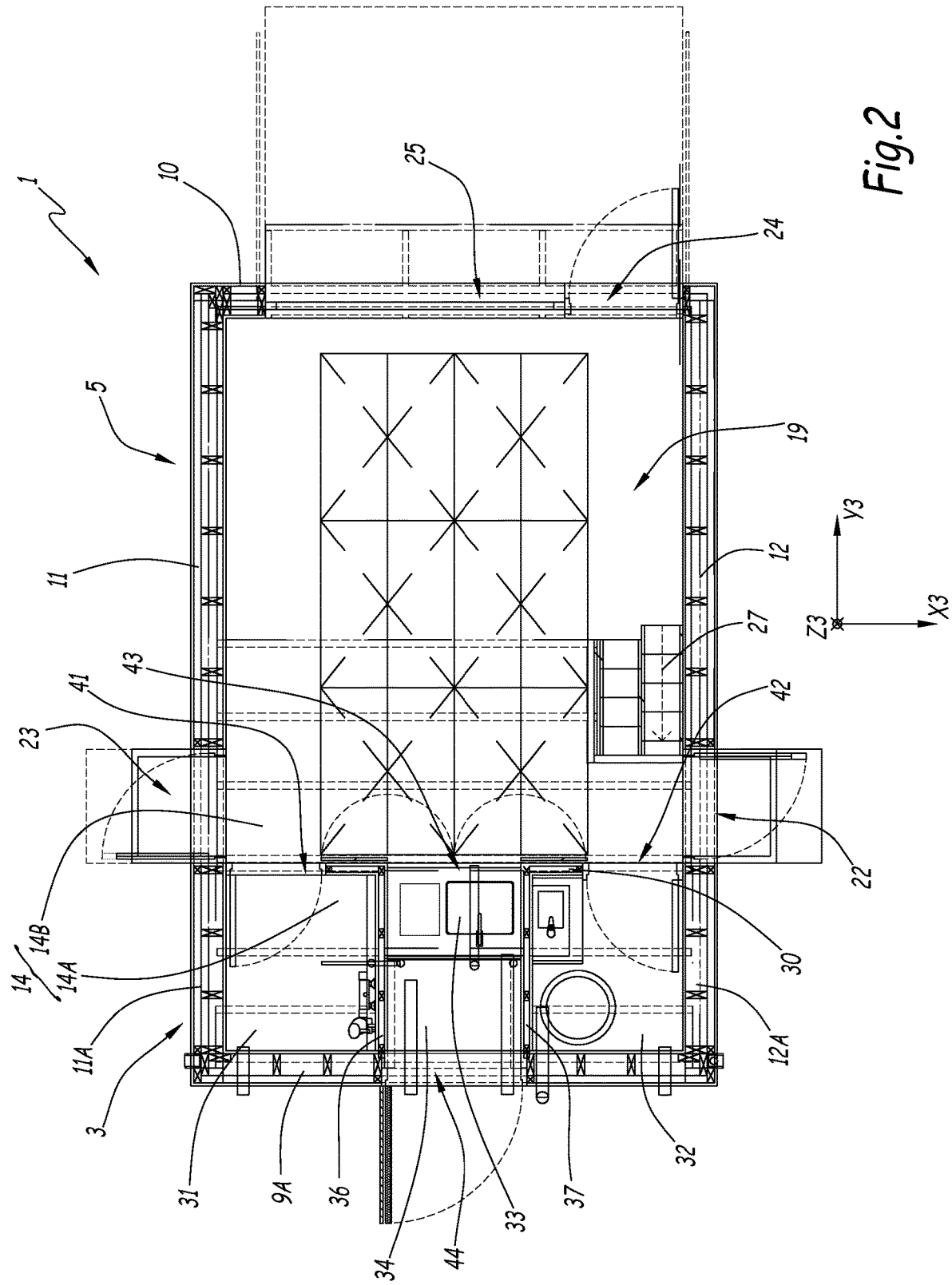
FIG. 2 is a sectional top view, to scale, along a horizontal plane, of the building of FIG. 1, in which the prefabricated module is shown integrated into the building.

FIGS. 1 and 2 show a building 1, which comprises a prefabricated module 3 for technical purposes and a module 5, preferably also prefabricated, or otherwise fabricated on the construction site, and which is preferably meant to form living spaces of the building.

A coordinate system is defined which is attached to the prefabricated module 3, which comprises a longitudinal direction X3 and a transverse direction Y3, which are horizontal and preferably perpendicular, as well as a height direction H3, which is preferably vertical, or at least perpendicular to the directions X3 and Y3. The directions X3 and Y3 define a floor plane XY3, the directions X3 and Z3 define a longitudinal plane XZ3, and the directions Y3 and Z3 define a transverse plane YZ3.

As shown in FIG. 1 and in the following figures, the module 3 is provided to form a preassembled box, all of the parts of which shown in FIGS. 1 to 10 are assembled in advance, the module 3 being designed to be integrated into the building 1 during construction, whereas it is still preassembled in this way, that is to say without being disassembled. In other words, the module 3 assumes the form of a single block or a single piece, and is designed thus to be assembled in one piece with the module 5, which in turn is not necessarily in one piece, in order to form the building 1.

Preferably, the module 3 is dimensioned to be able to be delivered by maritime container and/or transported by truck without disassembly of the module 3, that is to say, in one piece. For example, the module 3 measures, in the direction X3, about 3.40 m (meters), in the direction Y3, about 1.40 m, in the direction Z3, about 2.50 m. It is preferable for the module 3 not to exceed the standard dimensions for transport in one piece by truck, that is to say, no more than 13.45 m, width 2.48 m and height 2.58 m. Preferably, the module 3 weighs about 1000 kg (kilograms), preferably less than 1500 kg, so as to be able to be lifted by a lifting vehicle of relatively modest capacity, in order for the module 3 to be integrated into the building 1.

In the present example, the building 1 is an individual residential building, that is to say, containing a single housing unit, the module 3 equipping this housing unit. The individual residential building assumes the form of a house. The housing unit of the building 1 also comprises the module 5, completing the module 3 in order to form the housing unit.

The module 3 is also suitable for being integrated into a collective residential building, that is to say, comprising several housing units, for example several apartments, each housing one person or an independent family. In this case, the building can integrate several modules 3, each module 3 preferably equipping a single housing unit of the building.

Without departing from the scope of the invention, the building can have a function other than residential, for example it may be a sporting building, an office or business building, a module different from the module 5 then advantageously being attached to the module 3.

In the present example, the building 1 is an autonomous building in terms of energy, water and disposal, that is to say, which is designed not to require a connection to service infrastructure, such as water, electricity, gas or sewer grids. The building 1 preferably incorporates storage, recycling and production means, described below, which allow it to have this autonomy. In a variant, it is possible to provide that the building is partially autonomous, in that it is not autonomous for all energy, water or disposal needs, or is autonomous for a limited length of time.

In the present example, as shown in FIGS. 1 and 2, the building 1 comprises lining walls, here four walls 9, 10, 11 and 12, including two gable walls 9 and 10, which are opposite and parallel to the plane XZ3, and two lateral walls 11 and 12 which are opposite and parallel to the plane YZ3. "Lining walls" refer to exterior walls of the building 1 forming façades of the building 1 and separating the inside from the outside of the building 1, these walls generally being loadbearing walls of the building 1, lined with thermal insulation and sealing means. The building 1 comprises a roof 7 mounted at the apex of the walls 9, 10, 11 and 12 in order to close the top of the building 1. The building 1 comprises at least one base floor 14, parallel to the plane XY3, and closing the building 1 at the base of the walls 9, 10, 11 and 12. In the present example, the building 1 comprises two levels, distributed along the direction Z3, and to this end comprises an upper level floor 15, a part 15B of which is shown in dotted lines in FIG. 1 by transparency behind the wall 9. The floor 15 is parallel to the plane XY3 is in an intermediate position between the floor 14 and the roof 7 along the direction Z3. Above the floor 15, an upper level is defined, while a ground-floor level is defined between the floors 14 and 15. Below the floor 14, the building comprises a system of foundations 16 for implanting and fixing the building 1 in the ground.

The module 5 completely forms the roof 7 and the wall 10. The wall 9 is formed in two parts 9A and 9B, the part 9B belonging to the module 5 and delimiting the upper level, the part 9A belonging to the module 3 and delimiting the ground-floor level. The wall 11 is formed in two parts 11A and 11B, the part 11B belonging to the module 5 and delimiting the upper level and the ground-floor level, the part 11A belonging to the module 3 and delimiting only the ground-floor level. The wall 11 is formed in two parts 12A and 12B, the part 12B belonging to the module 5 and delimiting the upper level and the ground-floor level, the part 12A belonging to the module 3 and delimiting only the ground-floor level.

More generally, the prefabricated module 3 comprises façades 9A, 11A, 12A and 30, as well as the roof 15A, which outwardly delimit the prefabricated module 3. The prefabricated module 3 also comprises a floor 14A.

The façades 9A and 30 are opposite and are longitudinal façades in that they are parallel to the plane XZ3, while the façades 11A and 12A are opposite and are transverse façades, in that they are parallel to the plane YZ3. The façades 9A, 11A, 12A and 30 form a closed contour of the module 3. In particular, each façade 11A and 12A connects the two façades 9A and 30 together.

Figure 8:
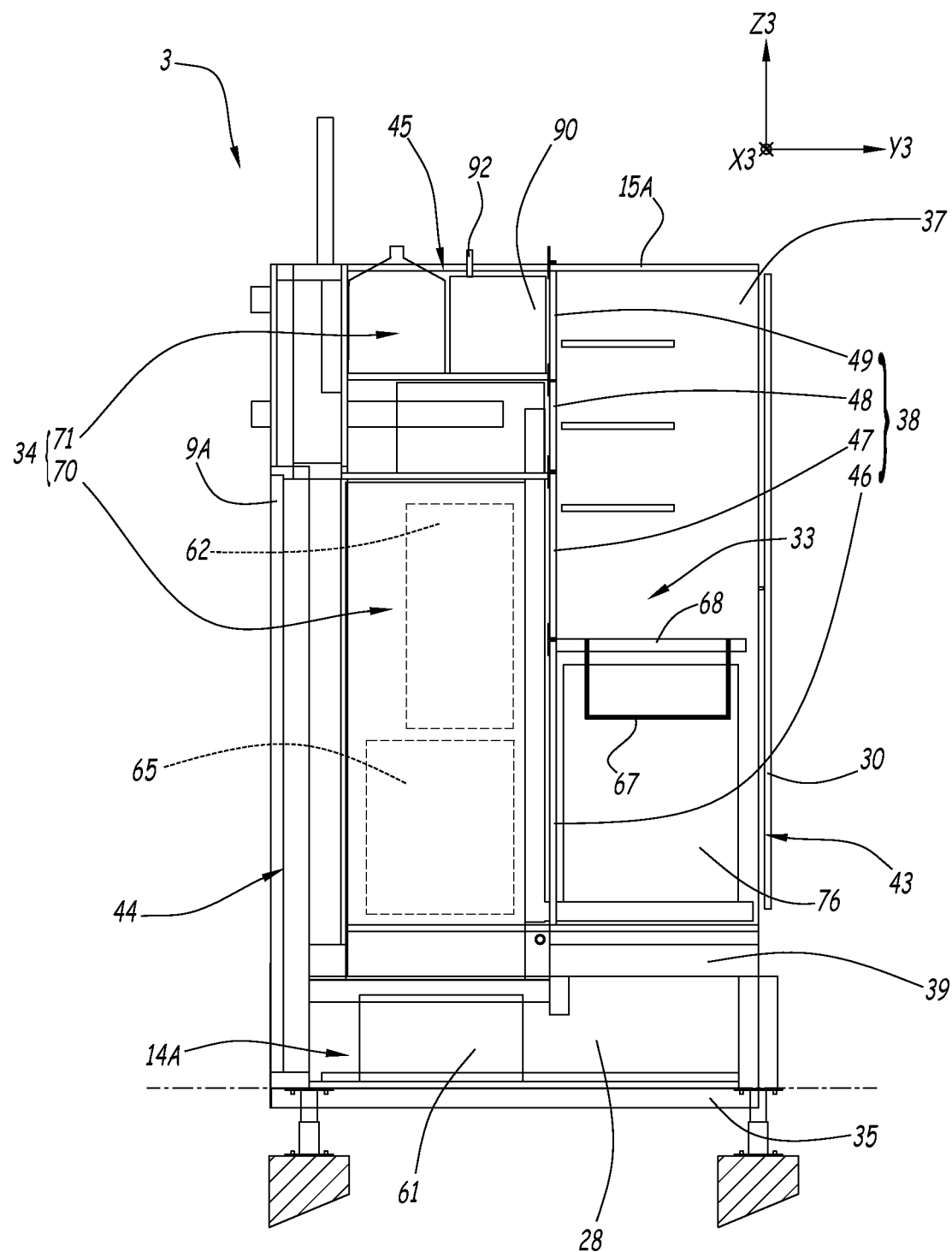
FIGS. 8, 9 and 10 are sectional views, to scale, of the prefabricated module, respectively along section lines VIII-VIII, IX-IX and X-X of FIG. 3, FIG. 10 showing a section line III-III of FIG. 3.
Figure 9:
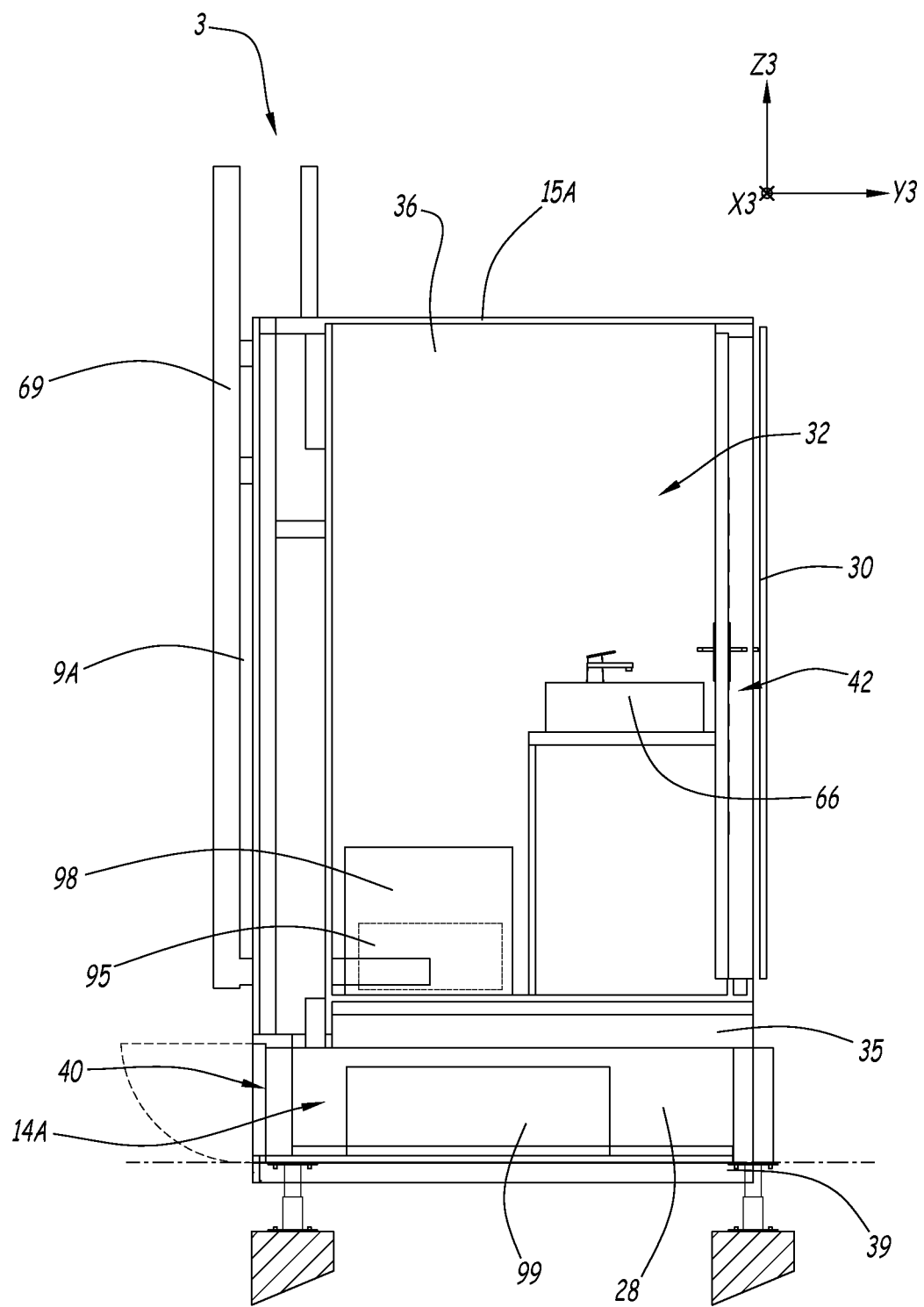
Figure 10:
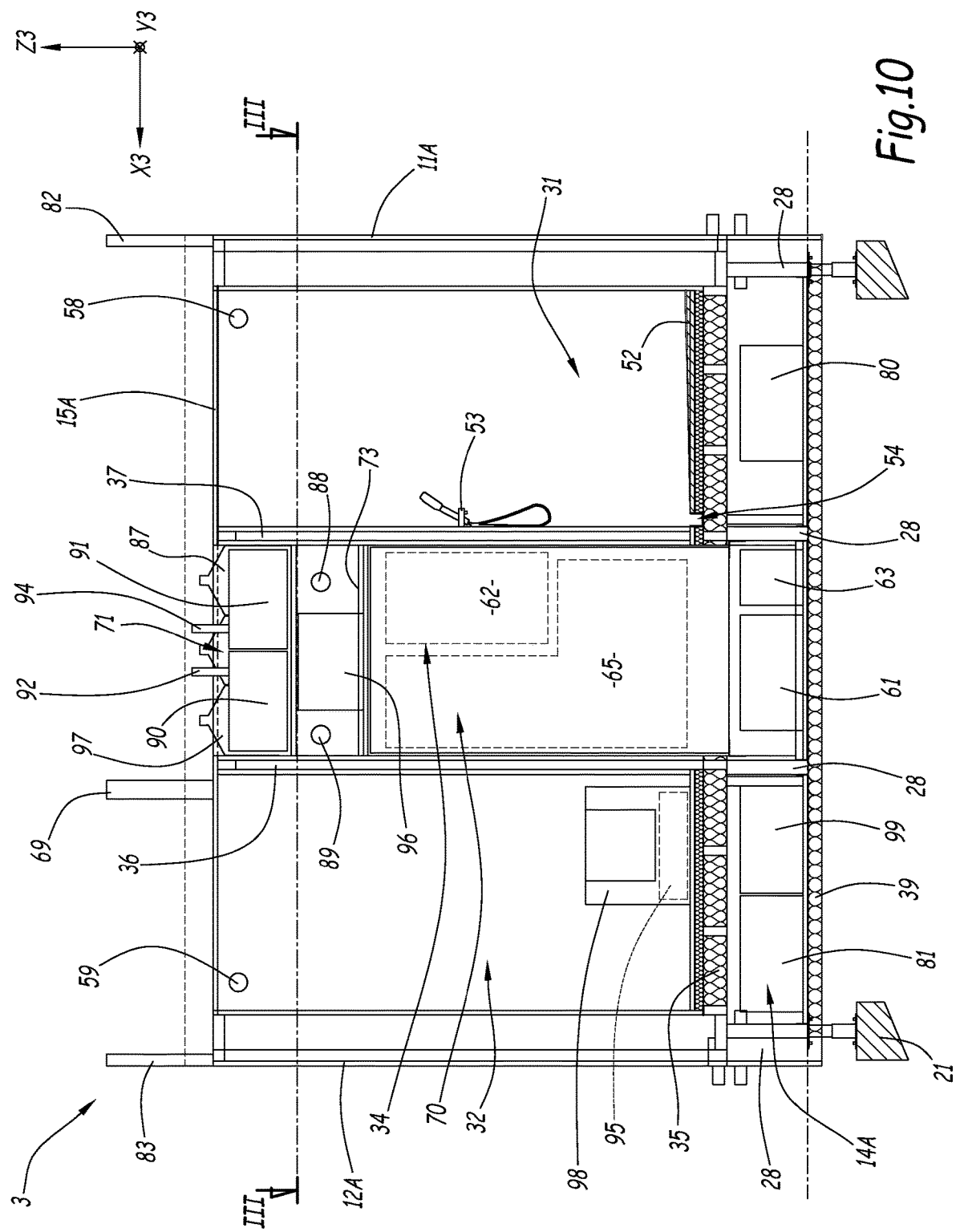

The roof 15A and the floor 14A are opposite and parallel to the plane XY3, and respectively close the façades 9A, 11A, 12A and 30 by the top and by the bottom. As shown in FIGS. 8, 9 and 10, the floor 14A preferably comprises one or several surface panels 35, which are coplanar and parallel to the plane XY3, one or several underside panels 39, which are coplanar and parallel to the plane XY3. Preferably, a single panel 35 and a single panel 39 are provided, which are continuous. The panel 35 delimits the top of the floor 14A, and the panel 39 delimits the bottom of the floor 14A. The panels 35 and 39 are at a distance from one another along the direction Z3. Between the panels 35 and 39, parallel beams 28 are advantageously provided, for example oriented along the direction Y3, in order to support the floor 14A. Between the panels 35 and 39, thermal insulation and sealing means are preferably provided.

Below the floor 14A, that is to say, opposite the direction Z3, the module 3 comprises foundations 21.

Preferably, the module 3 forms at least one part 9A, or even three parts 9A, 11A and 12A, lining walls 9, 10, 11 and 12 of the building 1, formed by the concerned façade(s) 9A, 11A and 12A. For the lining wall parts formed by the module 3, the module 3 advantageously integrates the structural support means of the building by the walls, that is to say, the framework, the sealing means, thermal insulation means, optionally acoustic insulation means, or even the outer cladding of the building 1, for example a siding or a coating.

Preferably, the module 3 forms a part 14A of the base floor 14 of the building 1, or, in a variant, of an upper level floor, formed by the floor 14A of the module 3. Preferably, the module incorporates, for these floor parts, the floor framework, for example comprising beams, sleepers or joists, as well as means for sealing, thermal insulation, optionally acoustic insulation.

Preferably, the module 3 also forms a part 15B of the upper level floor 15 of the building 1, or in a variant, a part of the roof of the building, formed the roof 15B of the module 3. The façade 30 of the module 3 advantageously forms one or several inner partitions of the building 1, in order to divide the upper level into several rooms.

The module 5 is designed so as to receive the module 5 for integration thereof into the building 1, or the module 5 is designed to be constructed around the module 3 in order to form the building 1. The parts of the building 1 formed by the module 5, in particular the parts of the lining walls, the roof and the floors, are configured in order to form a cavity 20 corresponding to the outer shapes of the module 3, as shown in FIG. 1, in order to receive the module 3 and thus to integrate it into the building 1. The module 3 being integrated into the building 1, the cavity 20 is closed off by the module 3.

When one or several upper levels are provided in the building 1, the access from one upper level to another is provided on the module 5. Here, the module 5 comprises an inner staircase 27 provided for this purpose, visible in FIG. 2.

As shown in FIG. 2, the building 1 comprises, on a same level, here on the ground-floor level:
- a living room/dining room 19, or any other living space, delimited by the module 5 on the floor part 14B, by the parts 11B, 12B and 10 of the lining walls, and by the façade 30 of the module 3, and
- a shower compartment 31, a toilet compartment 32, a kitchen compartment 33 and a technical compartment 34, delimited by the façades 9A, 11A, 12A and 30, the module 3 from the floor 14A to the roof 15A of the module 3.

Within the meaning of the invention, each "compartment" constitutes a room of the building 1, which a person can advantageously enter when this compartment is not occupied.

On the upper level, the building 1 delimits one or several other living areas, such as a bedroom, with the parts 9B, 10, 11B, 12B of the lining walls, and on the parts 15A and 15B of the floor 15.

More generally, it is preferred for the module 5 to delimit only living areas, such as a bedroom, a living room, a dining room and an office, while all of the technical compartments, namely here, the compartments 31, 32, 33 and 34, are integrated into the module 3.

Within the module 3, two transverse inner partitions 36 and 37 are provided, each connecting the façades 9A and 30, the floor 14A and the roof 15A, and being parallel to the façades 11A and 12A. The partitions 36 and 37 are connected by a longitudinal inner partition 38, between the façades 9A and 30, parallel to the façade 30.

Figure 3:
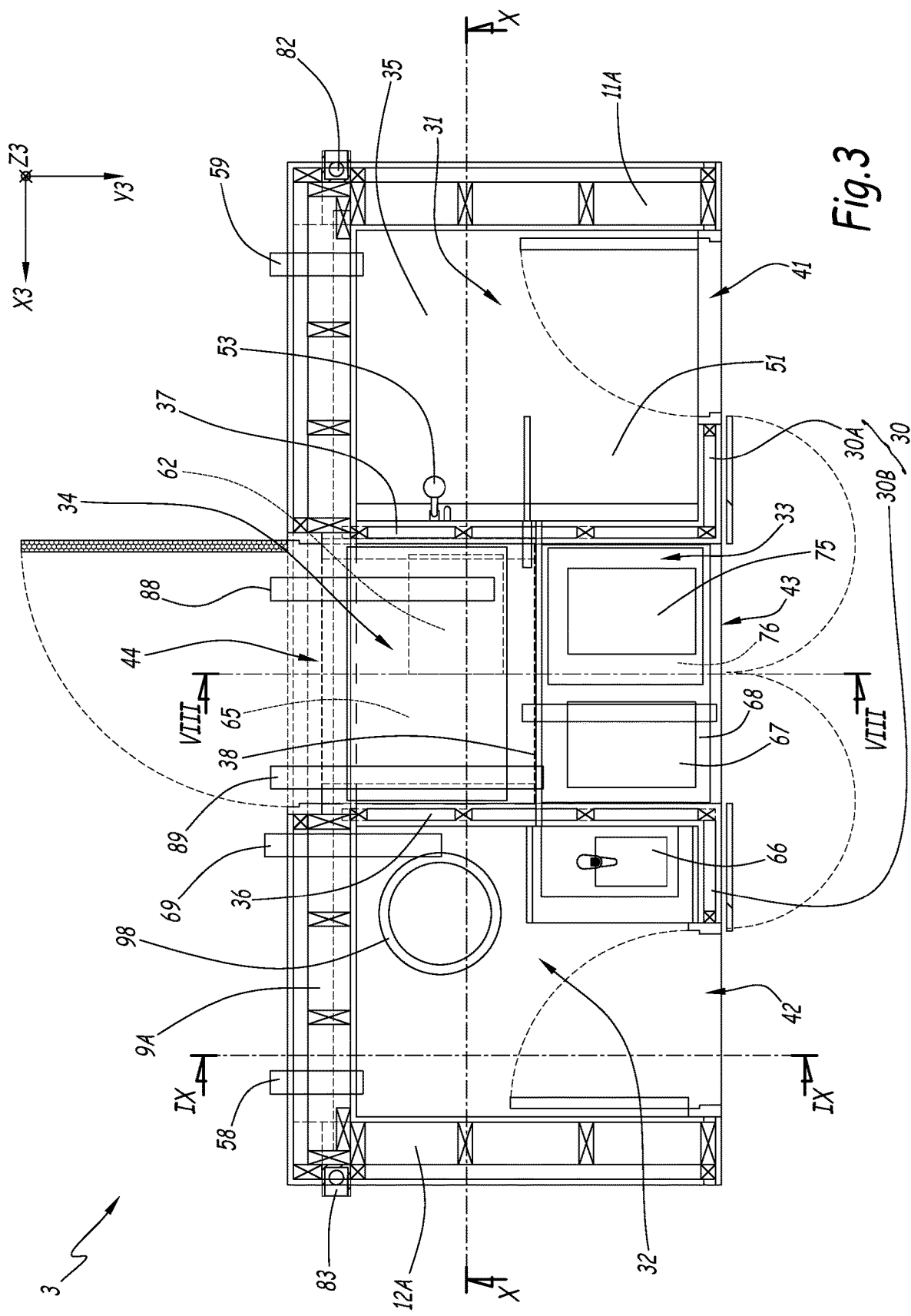
FIG. 3 is a view similar to FIG. 2, showing only the prefabricated module, on a larger scale.
Figure 4:
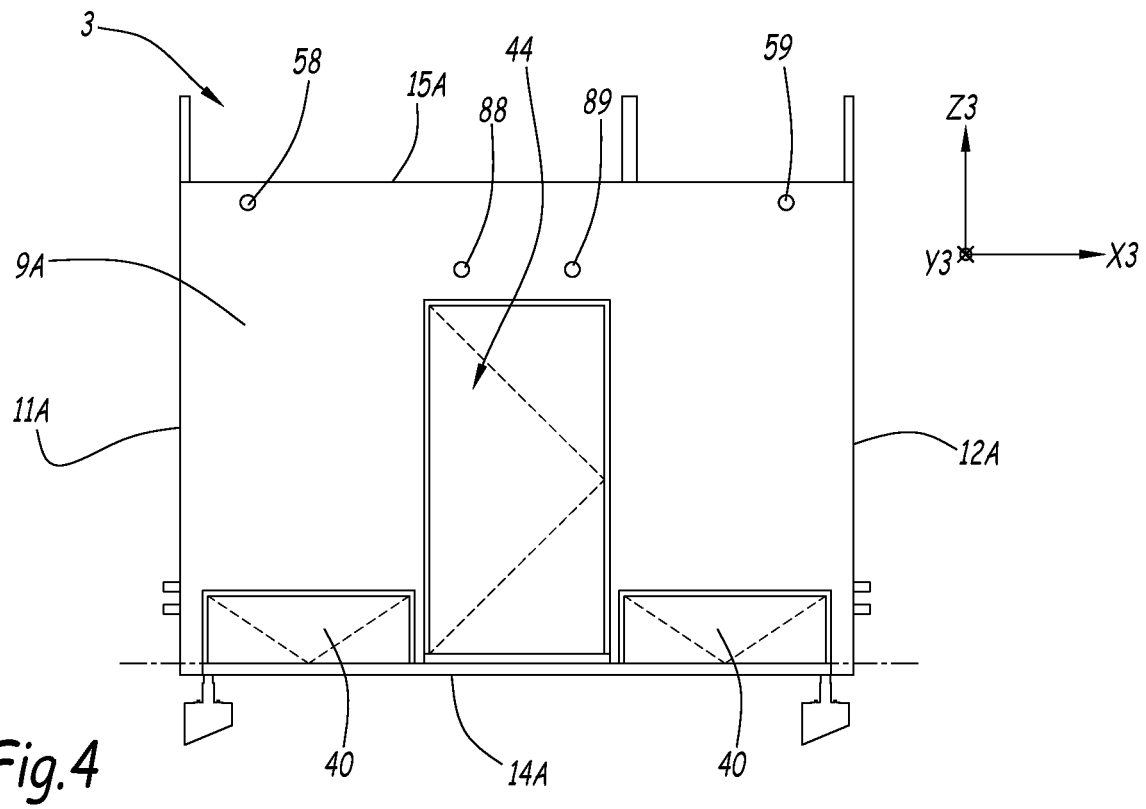

As visible in FIG. 3, the shower compartment 31 is delimited by the façades 9A, 11A and 30, as well as by the partition 37. In particular, the façade 30 comprises an inner partition 30A, called "inner shower partition," which delimits the shower compartment 31 and separates the shower compartment 31 from the room 19 of the module 5. The compartment 31 is delimited at the top by the roof 15A and at the bottom by the floor 14A, in particular by the panel 35.

The toilet compartment 32 is delimited by the façades 9A, 12A and 30, as well as by the partition 36. Thus, the shower 31 and toilet 32 compartments are positioned at respective longitudinal ends of the module 3. In particular, the façade 30 comprises an inner partition 30B, called "inner toilet partition," he which delimits the toilet compartment 32 and separates the toilet compartment 32 from the room 19 of the module 5. The compartment 32 is delimited at the top by the roof 15A and at the bottom by the floor 14A, in particular by the panel 35.

The kitchen compartment 33 is delimited by the façade 30, as well as by the partitions 36, 37, 38. The technical compartment 34 is delimited by the façade 9A, as well as by the partitions 36, 37 and 38. The compartments 33 and 34 are therefore positioned between the compartment 31 and 32, and delimited by the compartments 31 and 32 as well as by the two longitudinal façades 9A and 30. The compartments 33 and 34 are distributed transversely in the module 3. The compartments 33 and 34 are positioned back to back and separated only by the partition 38. The compartments 31 and 32 are separated only by the compartments 31 and 32. Preferably, the four compartments 31, 32, 33 and 34 together occupy the entire available floor surface of the module 3, the module 3 not comprising any other compartment. The compartment 33 is delimited at the top by the roof 15A and at the bottom by the floor 14A, in particular by the panel 35.

The compartment 34 is delimited at the top by the roof 15A and at the bottom by the floor 14A, in particular by the panel 39, no panel 35 advantageously being provided for the compartment 34, which therefore extends over a greater height than the compartments 31, 32 and 33.

The partitions 30A and 30B are advantageously coplanar with the plane of the façade 30 and together form the façade 30. The partition 30A connects the façade 11A to the partition 37, preferably without going past it. The partition 30B connects the façade 12A to the partition 36, preferably without going past it.

On the inner side of the module 3, the façades 9A, 11A, 12A and 30, the floor 14A, preferably the panels 35 of the floor 14A, the roof 15B and the partitions 36, 37 and 38 of the module 3 are preferably covered with their permanent cladding, for example a wooden siding, tiles, carpeting, paint or any similar cladding.

The shower compartment 31 comprises an access opening 41 for access by a person, which is advantageously arranged through the first façade 30, in particular in the partition 30A. The opening 41 places the compartment 31 directly in contact with the outside of the module 3, namely the room 19 of the building 1. "Directly" means that it is not necessary to go through another compartment of the module 3 to access the compartment 31 from the outside of the module 3. The opening 41 preferably extends from the floor 14A, preferably from the panel 35. The opening 41 is advantageously equipped with a prehung door, with a door, swinging for example toward the inside of the compartment 31 as shown in dotted lines in FIG. 3, in order to close off and selectively free the opening 41.

The toilet compartment 32 comprises an access opening 42 for access by a person, which is advantageously arranged through the first façade 30, in particular in the partition 30B. The opening 42 places the compartment 32 directly in contact with the outside of the module 3, namely the room 19 of the building 1. "Directly" means that it is not necessary to go through another compartment of the module 3 to access the compartment 32 from the outside of the module 3. The opening 42 preferably extends from the floor 14A, preferably from the panel 35. The opening 42 is advantageously equipped with a prehung door, with a door, swinging for example toward the inside of the compartment 32 as shown in dotted lines in FIG. 3, in order to close off and selectively free the opening 42. As respective prehung door for the openings 42 and 43, a prehung door separating interior rooms may be appropriate.

Figure 5:
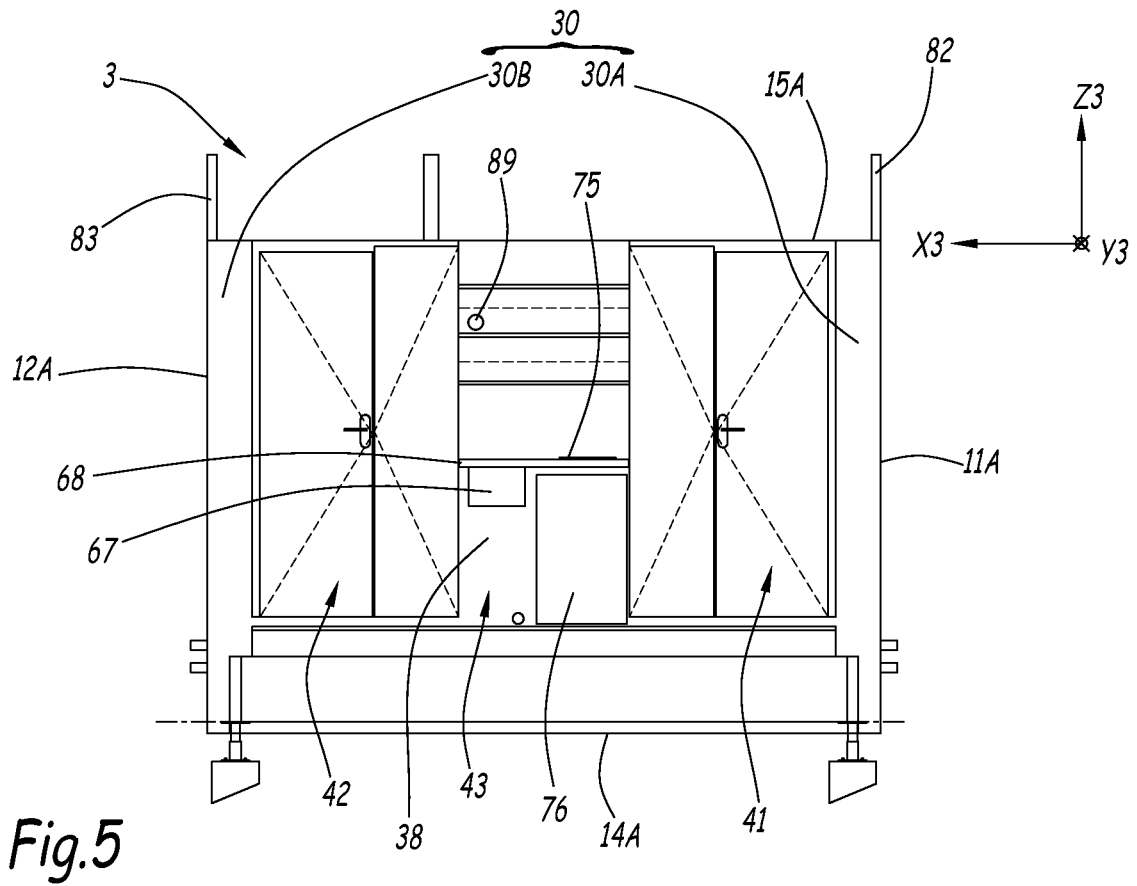

The kitchen compartment 33 comprises an access opening 43 for access by a person, which is advantageously arranged through the first façade 30, in particular by being delimited, along the direction X3, by the partitions 30A and 30B. The partitions 30A and 30B are therefore advantageously separated by the opening 43, which extends from the floor 14A to the roof 15A, as shown in FIG. 5. The opening 42 places the compartment 33 directly in contact with the outside of the module 3, namely the room 19 of the building 1. "Directly" means that it is not necessary to go through another compartment of the module 3 to access the compartment 33 from the outside of the module 3. The opening 43 preferably extends from the floor 14A, preferably the panel 35. The opening 43 is advantageously equipped with a prehung door, with a double door, each door swinging for example toward the outside of the compartment 33 as shown in dotted lines in FIG. 3, respectively folding against the partitions 30A and 30B in the open position, in order to close off and selectively free the opening 42. As prehung door for the opening 43, a prehung closet door may be appropriate.

The technical compartment 34 comprises an access opening 44 for access by a person, which is advantageously arranged through the second façade 9B, preferably between the partitions 36 and 37, considering the direction X3. The opening 44 places the compartment 34 directly in communication with the outside of the module 3, namely with the outside of the building 1. "Directly" means that it is not necessary to go through another compartment of the module 3 to access the compartment 34 from the outside of the module 3. The opening 44 preferably extends from the floor 14A, preferably the panel 39. The opening 44 is advantageously equipped with a prehung door, with a door, swinging for example toward the outside of the compartment 34 as shown in dotted lines in FIG. 3, in order to close off and selectively free the opening 44. As prehung door for the opening 44, a prehung door for separating an interior room from the outside, or a technical site prehung door, may be appropriate.

Other types of doors can be provided for the openings 41, 42, 43 and 44. In particular, it is possible to provide that the opening 43 remains open at all times and is devoid of door. Preferably, the module 3 is devoid of other access openings for access by a person. However, openings such as windows, for example, can optionally be provided.

The module 5 comprises at least one opening, which, when open, places the outside and the inside of the building 1 in communication, for access by a person. Here, the module 5 comprises three openings 22, 23 and 24. These openings 22, 23 and 24 each comprise a means for closing off the opening such as a door for closing off this opening. The module 5 also comprises one or several openings, for example a window 26 and a bay window 25. When the building 1 incorporates the module 3, the compartments 31, 32 and 33 are therefore accessible only from the room 19.

Owing to the arrangement of the compartments 31, 32, 33 and 34, all of the technical parts of the building 1, or at the very least, the residential unit that it houses, are concentrated in the module 3. Since the compartments 31, 32 and 33 all adjoin the compartment 34, the compartment 34 can serve each of them directly, so as to reduce the energy losses and the length of the internal grids of the building 1, while being accessible for maintenance, from a single opening 44 leading to the outside. The upkeep can thus be done in a centralized manner without the maintenance technician needing to pass through the inside of the building 1, in particular the room 19, in order to access the compartment 34. For their use by the occupants of the building 1, the arrangement of the compartments 31, 32 and 33 causes the openings 41, 42 and 43 to be able to be provided on a same façade 30, facing toward the inside of the building 1, and in particular leading to the living space 19.

Preferably, the longitudinal partition 38, which separates the kitchen compartment 33 from the technical compartment 34, comprises one or several removable panels, or even, like in the present example, is formed by the arrangement of several removable panels 46, 47, 48 and 49 which are positioned parallel to the direction Z3, as shown for example in FIG. 8. Each removable panel can be opened or detached, at least from the kitchen compartment 33 or from the technical compartment 34, so as to create one or several openings in order to place the technical compartment 34 and the kitchen compartment 33 in communication. This makes it possible, upon production of the module 3 and for upkeep thereof, to easily produce the fluid and/or electrical connections between the various compartments 31, 32, 33 and/or 34. Alternatively, one or several maintenance openings, for example able to be closed off by one or several hatches, can be provided.

Preferably, the technical compartment 34 comprises a sub-compartment 70 dedicated to water, and a sub-compartment 71 dedicated to energy. Here, the sub-compartments 70 are [separated] by a panel 73 parallel to the plane XY3, positioned between the roof 15A and the floor 14A. The compartment 70 is delimited by the panel 73 and the floor 14A and the compartment 71 delimited by the panel 73 and the roof 15B. Preferably, the sub-compartment 70 is accessible through the opening 44, while the sub-compartment 71 is accessible directly from the outside of the module 3 through an opening 45 arranged through the roof 15A.

In order to make the building 1 water-autonomous, the technical compartment 34 comprises a domestic water supply 61, comprising a tank, and advantageously a pump (not illustrated). Preferably, the supply 61 is in the sub-compartment 70.

As is better visible in FIG. 10, the shower compartment 31 comprises a shower 51. Preferably, the supply 61 supplies the shower 51 with unheated domestic water, using plumbing, not illustrated, passing through the partition 37. The domestic water is advantageously potable water, or otherwise water clean enough to be suitable for use for showering, grooming and/or doing dishes.

The technical compartment 34 also comprises a water heater 62, or boiler, also supplied with domestic water by the supply 61, using plumbing, not illustrated, and which supplies the shower 51 with heated domestic water, using plumbing, not illustrated, passing through the partition 37. Preferably, the water heater 62 is in the sub-compartment 70. Advantageously, the water heater 62 comprises a connector, not illustrated, in order to be connected to a water heating grid of the building 1, and to supply it with hot water for heating purposes.

In order to make the building 1 autonomous in terms of wastewater, the technical compartment 34 also preferably comprises a graywater supply 63, or tank, supplied by the graywater discharged by the shower 51, by using domestic water. The supply 63 is advantageously provided in the sub-compartment 70. The supplies 61 and 63 are advantageously positioned at the bottom of the technical compartment 34, for example resting on the top of the panel 39. The water heater 62 is in turn positioned higher up, above the supplies 61 and 63 in the direction Z3, as shown in FIG. 10, for example near the panel 73.

In the present example, the shower 51 comprises a basin 52 integrated on the upper surface of the floor 14A, as well as a faucet 53, above the basin 52, and here comprising a knob mounted on a flexible pipe.

The faucet 53 is preferably mounted on the partition 37, so as to be back to back with the technical compartment 34 and to be supplied with water by the water heater 62 and/or by the supply 61, from the technical compartment 34, by plumbing passing only through the partition 37. The faucet 53 being very close to the water heater 62, little heat is lost.

The basin 52 preferably occupies the entire surface on the floor of the compartment 31, if not most of this floor surface. The basin 52 forms an inclined runoff gradient relative to the plane XY3, of several degrees, for example about the axis Y3. Preferably, the runoff gradient is configured so that the water emitted by the faucet 53 runs along the basin 52 in the direction X3, that is to say, toward the compartments 33 and 34. The basin 52 is advantageously provided with a gutter 54 or an orifice for recovering the water that has thus run, the gutter 54 being provided along the partition 37. The gutter 54 is therefore close to the graywater supply 63, and is connected thereto by plumbing, not illustrated, through the partition 37, or through the floor 14A, optionally through one of the beams 28 inserted between the supply 63 and the gutter 54.

The kitchen compartment 33 comprises a sink 67, in particular visible in FIGS. 3 and 9, including a bowl and a water faucet serving the bowl. The sink 67 is advantageously suitable for washing dishes. In the present case, the sink is back to back with the partition 38, so as to be supplied with water by the supply 61 and/or the water heater 62, through the partition 38, via plumbing, not shown. The graywater generated by the sink 67 supplies the graywater supply 63 also through the partition 38, or through the floor 14A, by plumbing, not shown. The sink 67 advantageously being at the same height as the water heater 62, little heat is lost during the transport of the hot water to the sink. At least part of the partition 38 being removable, the connection and the maintenance of the connection of the sink 67 to the equipment of the technical compartment 34 is particularly easy.

Preferably, the kitchen 33 comprises a work surface 68, parallel to the plane XY3, positioned between the floor 14A and the roof 15A while being supported by at least one of the partitions 36, 37 and 38, and supporting the sink 67.

Preferably, the shower compartment 31 or toilet compartment 32, here the toilet compartment 32 comprises a dry sink 66, in particular visible in FIGS. 3 and 9, including a bowl and a water faucet serving the bowl. In the present case, the dry sink 66 is back to back with the partition 36, so as to be supplied with water by the supply 61 and/or the water heater 62, through the partition 36, via plumbing, not shown. The graywater generated by the dry sink 66 supplies the graywater supply 63 also through the partition 36, or through the floor 14A, by plumbing, not shown.

Preferably, in order to improve the water autonomy of the building 1, the technical compartment 34 comprises a purification apparatus 65, for generating domestic water by purifying graywater coming from the supply 63. The appliance 65 is supplied with graywater by the supply 63, by plumbing, not illustrated. The purification apparatus 65 supplies the supply 61 with the domestic water coming from the purification of graywater, by plumbing, not illustrated. The appliance 65 advantageously comprises a pump, as well as any equipment necessary to treat graywater, namely for example one or several filters, for example comprising a grease filter, an apparatus for treating water with ultraviolet radiation, and/or a reverse osmosis treatment apparatus. Preferably, the apparatus 65 occupies the sub-compartment 70, and is positioned above the supplies 61 and 63.

Preferably, in order to increase the water autonomy of the building 1, the prefabricated module comprises outside water supplies 80 and 81, for example tanks. A number of supplies other than two can be provided for this purpose, for example a single supply. "Outside water" refers to water coming from outside the building 1 and from the module 3, not coming from a supply grid and being captured by the module 3 and/or by the building 1. The outside water is generally not domestic, in that it is not potable or not usable directly by the equipment of the module 3 without being treated by the purification apparatus 65. In the present example, the outside water is rainwater.

The supplies 80 and 81 are advantageously positioned in the technical compartment 34, for example in the sub-compartment 70, or otherwise, as illustrated, in the thickness of the floor 14A. Here, the supply 80 is below the shower compartment 31, while the supply 81 is below the toilet compartment 32. For the maintenance of the supplies 80 and 81 and/or of any element to be maintained which is positioned in the thickness of the floor 14A, one or several maintenance openings 40, advantageously each closed by a hatch, are provided through the façade 9A, at floor 14A height.

The module 3 comprises outside rain collectors 82 and 83, respectively associated with the supplies 80 and 81. Here, each collector 82 and 83 comprises a downspout, oriented parallel to the direction Z3, and respectively running alongside the façades 11A and 12A, on the outside of the module 3, from the roof 15A to the floor 14A. Each collector 82 and 83 is connected to its respective supply 80 and 81, in order to supply it with outside water, here respectively by plumbing passing through the façades 11A and 12A. Each supply 80 and 81 supplies outside water to the appliance 65 through plumbing, not illustrated. The appliance 65 purifies this outside water in order to convert it into domestic water, and thus to supply this domestic water to the supply 61.

Advantageously, in order to capture the outside water, at least one of the collectors 82 and 83 is connected to a downspout system of the building 1, belonging to the module 5, for example comprising gutters along the roof 7, as well as one or several downpipes. Here, two separate collectors 82 and 83 are provided so that the module 3 is adapted to different buildings 1, one or the other alternatively being able to be used, or both, as a function of the configuration of the module 5.

In a variant, the outside water is river, lake or sea water, recovered by the module 3 and/or by the building 1, the outside water collector being modified accordingly, as well as optionally the purification apparatus.

The kitchen compartment 33 also comprises a cooking appliance 75, which in the present example assumes the form of a cooking plate shown in FIG. 3. As cooking appliance 75, it would alternatively or additionally be possible to provide a traditional or microwave oven, which would also be positioned in the kitchen compartment 33. Here, the cooking plate is mounted on the work surface 68, side-by-side with the sink 67 parallel to the direction X3.

Preferably, the kitchen compartment 33 also comprises a refrigerator 76, which is for example positioned on the floor 14A below the work surface 68.

More generally, all of the equipment of the kitchen compartment 33 is accessible from the opening 43 leading to the room 19, so as to form a kitchen which is open onto the room 19.

In order to make the building 1 energy-autonomous, the technical compartment 34 also comprises a power energy supply, which is preferably positioned in the sub-compartment 71. Power advantageously refers to energy which is spent in supplying an apparatus or machine, in order to bring this apparatus or machine productively online, as opposed to control energy. The power thus stored is advantageously of several types: it may in particular be electricity or fuel. Irrespective of the choice of stored energy, the power energy supply of the sub-compartment 71 supplies the various technical equipment items integrated into the module 3, namely the water heater 62 and the cooking appliance 75.

Preferably, the power energy supply of the compartment 34 comprises a fuel supply 87 supplying the cooking appliance 75 and the water heater 62 with fuel for the operation thereof. The fuel is for example a fluid fuel, for example gas, stored in liquefied form, the fuel supply 87 for example assuming the form of one or several fuel cylinders positioned in the compartment 34, preferably the sub-compartment 71. The supply 87 is advantageously connected by plumbing and/or appropriate pipes, not illustrated, to the water heater 62 and to the cooking appliance 75. For the cooking appliance 75, this connection is done through the partition 38.

Preferably, the module 3 comprises a ventilation system, for example comprising a mouth 58 and a mouth 59 which are arranged through the façade 9A, so as to respectively ventilate the shower 31 and toilet 32 compartments. Thus, the ventilation is ensured toward the outside of the module 3, for the compartments 31 and 32. In the case of a fuel water heater 62, the ventilation system advantageously comprises a pipe 88 for discharging burnt fuel passing through the façade 9A, for discharging the burnt fuel outside the module 3 via the façade 9A. For the kitchen compartment 33, the ventilation system advantageously comprises a pipe 89 for discharging burnt fuel, or simply cooking emanations. Preferably, the pipe 89 passes through the partition 38, the technical compartment 34 and the façade 9A in order to discharge the burnt fuel from the module 3 via the façade 9A.

The ventilation system can be passive in order to save energy, or on the contrary can be active, and to this end comprise forced ventilation, for example equipping all or some of the aforementioned mouths and pipes.

Preferably, the power energy supply comprises an electricity supply 90 and 91, here comprising two electric batteries 90 and 91. Based on the application, a different number of electric batteries can be provided, for example a single battery. The electricity supply 90 and 91 is advantageously placed next to the fuel supply, to be accessible preferably from the opening 45. In the technical compartment 34, the module 3 can also incorporate any electricity converter, or any electrotechnical material which is useful to convert, control, quantify, treat and transport the electrical energy emitted and received by the supply 90 and 91.

Preferably, the electrical energy supply 90 and 91 of the technical compartment 34 supplies the purification apparatus 65, as well as any pump(s) provided to circulate water of the module 3 through the water heater 62, the shower 51, the sink 67, the dry sink 66, the purification apparatus 65. The supply 90 and 91 preferably supplies the refrigerator 76 with electrical energy for the operation thereof, through the partition 38. The supply 90 and 91 preferably supplies the ventilation system, if it uses forced ventilation. The supply 90 and 91 preferably supplies an interior light of the compartments 31, 32, 33 and/or 34, integrated into the module 3. In the scenario where the cooking appliance 75 and/or the water heater 62 operates with electricity, they could also be supplied by the supply 90 and 91. Any other electrical equipment of the module 3 could thus be supplied with electricity, in particular a domestic electricity distribution grid, comprising at least one electrical outlet, provided for example in the kitchen compartment 33 in order to plug in an apparatus.

The module 3 also preferably comprises a power connector 94, for connecting the electricity supply 90 and 91 to a domestic power grid of the building 1, belonging to the module 5, to be supplied with electrical energy stored in the electricity supply 90 and 91. For example, the connector 92 protrudes through the opening 45. This household power grid of the module 5 comprises at least one power outlet, for example provided in the room 19. The electricity supply of the domestic grid of the module 5 is only possible when the module 3 is connected thereto.

The module 3 preferably comprises an electrical charging connector 92, for connecting the electricity supply 90 and 91 to an outside electricity source 93, preferably belonging to the building 1. The supply 90 and 91 is thus charged with electrical energy by the source 93. For example, the connector 92 protrudes through the opening 45. In the present example, the electricity source 93 comprises a set of photovoltaic panels 93 which are arranged on the roof 7 of the building 1 and connected to the connector 94 via a power grid of the module 5. These photovoltaic panels 93 could also be placed on adjoining land. It would alternatively be possible to provide, as electricity source, one or several wind turbines, or any other local electrical energy production means. These means increase the electrical energy autonomy of the building 1.

Additionally or alternatively relative to the presence of the charging connector 92, the module 3 advantageously comprises an electrical generator 96. The electoral generator 96 charges the electricity supply 90 and 91 so as to increase the energy autonomy of the building 1.

In the present example, since the outside energy source 93 can charge the supply 90 and 91, the generator 96 is a backup generator, when the outside energy source 93 does not provide enough energy, for example in the absence of sun and/or wind, based on the chosen source 93.

The generator 96 is placed in the technical compartment 34, preferably in the sub-compartment 71. For example, the generator 96 is placed between the power energy supply and the sub-compartment 70 dedicated to water.

For minimal sound and atmospheric pollution, it is preferable for the generator 96 to be a fuel cell, supplied by a fuel cell supply 97, for example methanol or hydrogen, provided in the technical compartment 34, for example in the sub-compartment 71. The supply 97 preferably belongs to the power energy supply and is therefore advantageously placed next to the batteries 90 and 91 of the supply 87.

The toilet compartment 32 comprises a restroom, that is to say an assembly comprising a toilet seat 98, with a basin, and recovery, disposal and/or treatment means for waste produced by the seat. Here, the seat 98 is mounted on the floor 14A in order to be able to be used by a person located in the compartment 32.

Preferably, the restroom is a dry toilet, that is to say, a toilet which does not need water to operate, so as to reduce the water consumption and thus to increase the autonomy of the building 1 with respect to the water supply and waste disposal. In a variant, it would be possible to provide that the restroom operates with water, more conventionally, for example supplied with water by one of the water supplies 61 or 63 of the technical compartment 34.

Particularly preferably, if a dry toilet is chosen like in the present example, it is a dry toilet with urine separation. In other words, while waste comprises two components, namely urine and feces, the dry toilet separates the feces and the urine. For example, to this end, the seat 98 comprises two separate receiving orifices, one for receiving urine, the other for receiving feces, or any other appropriate separating means. The dry toilet advantageously comprises a urine supply 99, or tank, connected to the seat 98 for receiving the urine. Here, the urine supply 99 is installed below the toilet compartment 32, in the thickness of the floor 14A, that is to say, between the panels 35 and 39, so as to be able to be emptied and/or replaced by access via the opening 40. The urine supply 99 is therefore advantageously connected to the seat 98 by pipes or plumbing, through the panel 35. Alternatively, the supply 99 could be placed in the technical compartment 34, preferably below the plane of the panel 35 supporting the seat 98. The dry toilet also comprises a feces dryer, comprising a feces supply 95, supplied by the seat 98, and a drying pipe 69, for drying the feces contained in the supply 95. Here, the supply 95 is integrated into the seat 98. The drying pipe 69 is connected to the supply 95 and passes through the façade 9A so as to allow drying owing to the outside air of the building 1.

At the end of its production, the module 3 being provided preassembled and functional, for the equipment items that it incorporates. Once integrated into the building 1, the equipment items that it incorporates remain functional without modification. This considerably reduces the intervention by technicians on the construction site, except to connect the technical grids of the module 3 to the module 5, for example the collectors 82 and 83, the drying pipe 69, the heating pipes, the domestic power grid, etc. In particular, irrespective of whether the module 3 is connected to the building, if the electrical energy supply 90, 91 is charged, for example using the generator 96, the purification apparatus 65, the pumps provided for circulating water through the water heater 62, the shower 51, the sink 67, the dry sink 66, the purification apparatuses 65, the refrigerator 76, the ventilation system, if it uses forced ventilation, the interior lighting of the compartments 31, 32, 33 and/or 34, are functional. In particular, irrespective of whether the module 3 is connected to the building 1, if the fuel supply 87 is charged, the cooking appliance 75 and the water heater 62 are functional. Preferably, the restroom is also functional, irrespective of whether the module 3 is connected to the building.

As a result, instead of being integrated into a building like the building 1, the module 3 can be installed individually, so as to be completely independent of any building, on a site, for example a campsite. The module 3 then serves as a restroom and kitchen, preferably autonomous. It is not necessary to provide a technical intervention to mount its internal equipment items, which are advantageously already functional upon delivery.

Prior to its integration in the building 1, the module is provided and transported for delivery on the construction site of the building 1, whereas:

the module 3 is in one piece, that is to say, it is mechanically mounted, for its structural parts such as the façades, the inner partitions, the floor and the roof, as defined above, the toilet seat 98 and the dry sink 66 are already installed in the toilet compartment 32 as defined above, the shower 51 is already installed in the shower compartment 31 as defined above, the sink 67, the cooking appliance 75 and the refrigerator 76 are already installed in the kitchen compartment 33, the domestic water supply 61, the water heater 62, the purification apparatus 65, as well as the various supplies 61, 63, 80, 81 and 99, are already installed in the technical compartment 34 and serve the shower 51, the sink 67, the dry sink 66, the toilet seat 98, or any other equipment item described above, the power energy supply is already installed in the technical compartment and can supply their various associated equipment items mentioned above.

Based on the application, some of the above components may not be mounted on the module 3 when it is delivered and are mounted afterwards, for example the refrigerator 76, or the foundations 21.

The invention claimed is:

1. A prefabricated module configured to be integrated in one piece into a building, the prefabricated module comprising, in one piece:
   a floor;
   a roof;
   a shower compartment comprising a shower, and a first access opening for access by a person, the first access opening placing the shower compartment directly in communication with the outside of the prefabricated module;
   a toilet compartment comprising a toilet seat, and a second access opening for access by the person, the second access opening placing the toilet compartment directly in communication with the outside of the prefabricated module, the shower compartment and the toilet compartment being disposed longitudinally opposite one another with respect to the prefabricated module;
   a kitchen compartment comprising a sink, a cooking appliance, and a third access opening for access by the person, the third access opening placing the kitchen compartment directly in communication with the outside of the prefabricated module; and
   a technical compartment comprising
      a domestic water supply including a tank, the domestic water supply supplying unheated domestic water to the shower and the sink,
      a water heater supplying heated domestic water to the shower and the sink, the water heater being supplied with the unheated domestic water by the tank of the domestic water supply,
      a panel,
      a water sub-compartment delimited between the floor of the prefabricated module and the panel of the technical compartment, the domestic water supply and the water heater being disposed in the water sub-compartment, the domestic water supply being disposed at a bottom of the technical compartment, the water heater being disposed above the domestic water supply near the panel,
      an energy sub-compartment delimited between the panel and the roof of the prefabricated module,
      an energy supply supplying energy to the cooking appliance and the water heater, the energy supply being disposed in the energy sub-compartment, and
      a fourth access opening for access by the person, the fourth access opening placing the technical compartment directly in communication with the outside of the prefabricated module,
   wherein the kitchen compartment and the technical compartment are arranged between the shower compartment and the toilet compartment, the kitchen compartment and the technical compartment being transversely opposite one another with respect to the prefabricated module.

2. The prefabricated module according to claim 1, wherein:
   the prefabricated module comprises façades which outwardly delimit the prefabricated module, the façades including:
      a first longitudinal façade and a second longitudinal façade which are opposite one another, and
      a first transverse façade and a second transverse façade which are opposite one another, each of the transverse façades connecting the first longitudinal façade to the second longitudinal façade,
   the shower compartment is delimited by the first transverse façade and by the two longitudinal façades, the first access opening being disposed through the first longitudinal façade,
   the toilet compartment is delimited by the second transverse façade and the two longitudinal façades, the second access opening being disposed through the first longitudinal façade,
   the kitchen compartment is delimited by the first longitudinal façade, the third access opening being disposed through the first longitudinal façade, and
   the technical compartment is delimited by the second longitudinal façade, the fourth access opening being disposed through the second longitudinal façade.

3. The prefabricated module according to claim 2, further comprising a longitudinal inner partition separating the kitchen compartment from the technical compartment, the longitudinal inner partition comprising at least one removable panel configured to provide access to the technical compartment from the kitchen compartment.

4. The prefabricated module according to claim 2, wherein:
   the cooking appliance and the water heater are configured to operate using fuel, and
   the energy supply comprises a fuel supply supplying the cooking appliance and the water heater with the fuel.

5. The prefabricated module according to claim 2, wherein the technical compartment comprises:
   a graywater supply supplied with graywater by the shower and the sink; and
   a purification apparatus configured to generate domestic water by purifying the graywater coming from said graywater supply, the purification apparatus supplying the domestic water supply coming from the graywater purification.

6. The prefabricated module according to claim 2, wherein:
   the energy supply comprises:
      an electricity supply,
      an electrical charging connector configured to connect the electricity supply to an outside electricity source, thereby charging the electricity supply with electrical energy, and
      a power connector configured to connect the electricity supply to a domestic power grid of the building, the power connector being supplied with the electrical energy stored in the electricity supply, and
   the technical compartment comprises an electrical generator charging the electricity supply.

7. The prefabricated module according to claim 1, further comprising a longitudinal inner partition separating the kitchen compartment from the technical compartment, the longitudinal inner partition comprising at least one removable panel configured to provide access to the technical compartment from the kitchen compartment.

8. The prefabricated module according to claim 7, wherein:
the cooking appliance and the water heater are configured to operate using fuel, and
the energy supply comprises a fuel supply supplying the cooking appliance and the water heater with the fuel.

9. The prefabricated module according to claim 7, wherein the technical compartment comprises:
a graywater supply supplied with graywater by the shower and the sink; and
a purification apparatus configured to generate domestic water by purifying the graywater coming from said graywater supply, the purification apparatus supplying the domestic water supply coming from the graywater purification.

10. The prefabricated module according to claim 7, wherein:
the energy supply comprises:
an electricity supply,
an electrical charging connector configured to connect the electricity supply to an outside electricity source, thereby charging the electricity supply with electrical energy, and
a power connector configured to connect the electricity supply to a domestic power grid of the building, the power connector being supplied with the electrical energy stored in the electricity supply, and
the technical compartment comprises an electrical generator charging the electricity supply.

11. The prefabricated module according to claim 1, wherein:
the cooking appliance and the water heater are configured to operate using fuel, and
the energy supply comprises a fuel supply supplying the cooking appliance and the water heater with the fuel.

12. The prefabricated module according to claim 11, wherein the technical compartment comprises:
a graywater supply supplied with graywater by the shower and the sink; and
a purification apparatus configured to generate domestic water by purifying the graywater coming from said graywater supply, the purification apparatus supplying the domestic water supply coming from the graywater purification.

13. The prefabricated module according to claim 11, wherein:
the energy supply comprises:
an electricity supply,
an electrical charging connector configured to connect the electricity supply to an outside electricity source, thereby charging the electricity supply with electrical energy, and
a power connector configured to connect the electricity supply to a domestic power grid of the building, the power connector being supplied with the electrical energy stored in the electricity supply, and
the technical compartment comprises an electrical generator charging the electricity supply.

14. The prefabricated module according to claim 1, wherein the technical compartment comprises:
a graywater supply supplied with graywater by the shower and the sink; and
a purification apparatus configured to generate domestic water by purifying the graywater coming from said graywater supply, the purification apparatus supplying the domestic water supply coming from the graywater purification.

15. The prefabricated module according to claim 14, further comprising:
at least one outside water supply, and at least one outside water collector supplying the outside water supply with outside water and
the purification apparatus generates the purified domestic water by purifying outside water coming from the outside water supply, the purification apparatus supplying the domestic water supply with the purified domestic water.

16. The prefabricated module according to claim 1, wherein:
the energy supply comprises:
an electricity supply,
an electrical charging connector configured to connect the electricity supply to an outside electricity source, thereby charging the electricity supply with electrical energy, and
a power connector configured to connect the electricity supply to a domestic power grid of the building, the power connector being supplied with the electrical energy stored in the electricity supply, and
the technical compartment comprises an electrical generator charging the electricity supply.

17. The prefabricated module according to claim 1, further comprising a dry toilet, comprising the toilet seat.

18. A building, comprising:
the prefabricated module according to claim 1.

19. The building according to claim 18, wherein:
the prefabricated module comprises façades which outwardly delimit the prefabricated module, the façades including:
a first longitudinal façade and a second longitudinal façade which are opposite one another, and
a first transverse façade and a second transverse façade which are opposite one another, each of the transverse façades connecting the first longitudinal façade to the second longitudinal façade,
the shower compartment is delimited by the first transverse façade and the two longitudinal façades, the first access opening being disposed through the first longitudinal façade,
the toilet compartment is delimited by the second transverse façade and by the two longitudinal façades, the second access opening being disposed through the first longitudinal façade,
the kitchen compartment is delimited by the first longitudinal façade, the third access opening being disposed through the first longitudinal façade,
the technical compartment is delimited by the second longitudinal façade, the fourth access opening being disposed through the second longitudinal façade, the first longitudinal façade forming:
a first inner partition of the building, through which the first access opening is disposed, the first inner partition delimiting the shower compartment, and
a second inner partition of the building, through which the second access opening is disposed, the second inner partition delimiting the toilet compartment, and
the second longitudinal façade forms at least part of a lining wall of the building, through which the fourth access opening is disposed.

20. A construction method of constructing the building according to claim 18, the construction method comprising:
integrating the prefabricated module into the building, wherein the prefabricated module is in one piece, the toilet seat is previously installed in the toilet compartment, the shower is previously installed in the shower compartment, the sink and the cooking appliance are previously installed in the kitchen compartment, the domestic water supply and the water heater are previously installed in the technical compartment and supply the shower and the sink with the domestic water, and the energy supply is previously installed in the technical compartment and supplies the cooking appliance and the water heater with the energy.

\* \* \* \* \*